US012775124B2

(12) United States Patent
Xiong et al.

(10) Patent No.: US 12,775,124 B2
(45) Date of Patent: Oct. 27, 2026

(54) ADJUSTABLE OPTICAL APERTURE FOR AN IMAGING SYSTEM

(71) Applicant: Meta Platforms Technologies, LLC, Menlo Park, CA (US)

(72) Inventors: Shaomin Xiong, Newark, CA (US); Lidu Huang, Danville, CA (US); Michael Andrew Brookmire, Redwood City, CA (US); Zhaochun Yu, Wilmette, IL (US); Fei Liu, Los Altos, CA (US); Jianing Yao, San Jose, CA (US); Dongmin Yang, San Jose, CA (US); Yizhi Xiong, Foster City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 196 days.

(21) Appl. No.: 18/415,623

(22) Filed: Jan. 17, 2024

(65) Prior Publication Data

US 2024/0345293 A1 Oct. 17, 2024

Related U.S. Application Data

(60) Provisional application No. 63/459,837, filed on Apr. 17, 2023.

(51) Int. Cl.
*G02B 26/02* (2006.01)
*G02B 5/00* (2006.01)
*G02B 27/01* (2006.01)

(52) U.S. Cl.
CPC ............. *G02B 5/005* (2013.01); *G02B 26/02* (2013.01); *G02B 2027/0138* (2013.01); *G02B 27/0172* (2013.01); *G02B 2027/0178* (2013.01); *G02B 2207/101* (2013.01)

(58) Field of Classification Search
CPC .... G02B 5/005; G02B 26/02; G02B 27/0172; G02B 2027/0138; G02B 2027/0178; G02B 2207/101; G02B 5/008
See application file for complete search history.

(56) References Cited

U.S. PATENT DOCUMENTS

2011/0164330 A1* 7/2011 Henriksen ................ G02B 3/12 359/820
2016/0357010 A1* 12/2016 Bolis ...................... G02B 5/005

* cited by examiner

*Primary Examiner* — Euncha P Cherry
(74) *Attorney, Agent, or Firm* — FREESTONE INTELLECTUAL PROPERTY LAW PLLC; Aaron J. Visbeek

(57) ABSTRACT

A size of an optical aperture for an imaging system is adjustable. The size of the optical aperture can be adjusted based on refractive index matching, optical absorption, or near field coupling techniques. These techniques may also be used to provide a high speed optical shutter.

10 Claims, 12 Drawing Sheets

ADJUSTING AN OPTICAL APERTURE

ADJUSTABLE OPTICAL APERTURE FOR AN IMAGING SYSTEM

CROSS-REFERENCE TO RELATED APPLICATIONS

This application claims priority to U.S. provisional Application No. 63/459,837 filed Apr. 17, 2023, which is hereby incorporated by reference.

TECHNICAL FIELD

This disclosure relates generally to imaging systems, and in particular but not exclusively relates to an adjustable optical aperture for an imaging system, such as a camera or other imaging device that uses an aperture to control an amount of light that enters the imaging system.

BACKGROUND INFORMATION

An optical aperture is an opening in an optical element (such as a lens) through which light passes so as to enter an imaging system, such as a camera or other type of imaging device or image sensor. An aperture can be analogous to a pupil of a human eye, in that a wider aperture (e.g., larger opening) passes a larger amount of light as compared to a relatively narrower (e.g., smaller opening) aperture. Consequently in imaging applications, a wider aperture may result in a brighter image, whereas a narrower aperture may result in a darker image. Thus in a low-light environment (e.g., such as during the evening), a wider aperture is useful for allowing more light to reach the imaging system so as to improve the image quality, whereas a narrower aperture is useful in a bright environment (e.g., such as during normal daylight conditions) to reduce overexposure and noise in the image.

The aperture also affects the depth of field, which is represented by the amount of an image that appears sharp from foreground to background. For example, some images may have a shallow depth of field in which the background and foreground of the image are out-of-focus (e.g., blurred) while in-between the background and foreground is in focus, and other images may have a deeper depth of field in which both the background and the foreground of the image are sharp. A wider aperture results in a shallow depth of field (e.g., a large amount of blur in the background and foreground of an image), and a narrower aperture results in a deeper depth of field (e.g., both the background and the foreground of an image have a small amount of blur). Depending on the object(s)/environment(s) being imaged, a shallow depth of field, a deep depth of field, or some intermediate depth of field may be desired. For example, a wider aperture may be used in portrait photography, since a shallow depth of field is desired so as to provide the sharpest image for the object being photographed, while the background of the object can be permissibly blurred. In comparison, a narrower aperture may be desired in landscape/scenic photography, since a deeper depth of field provides the sharpest image for both the background and foreground.

However, it can be challenging to provide an imaging system with a suitably sized aperture.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
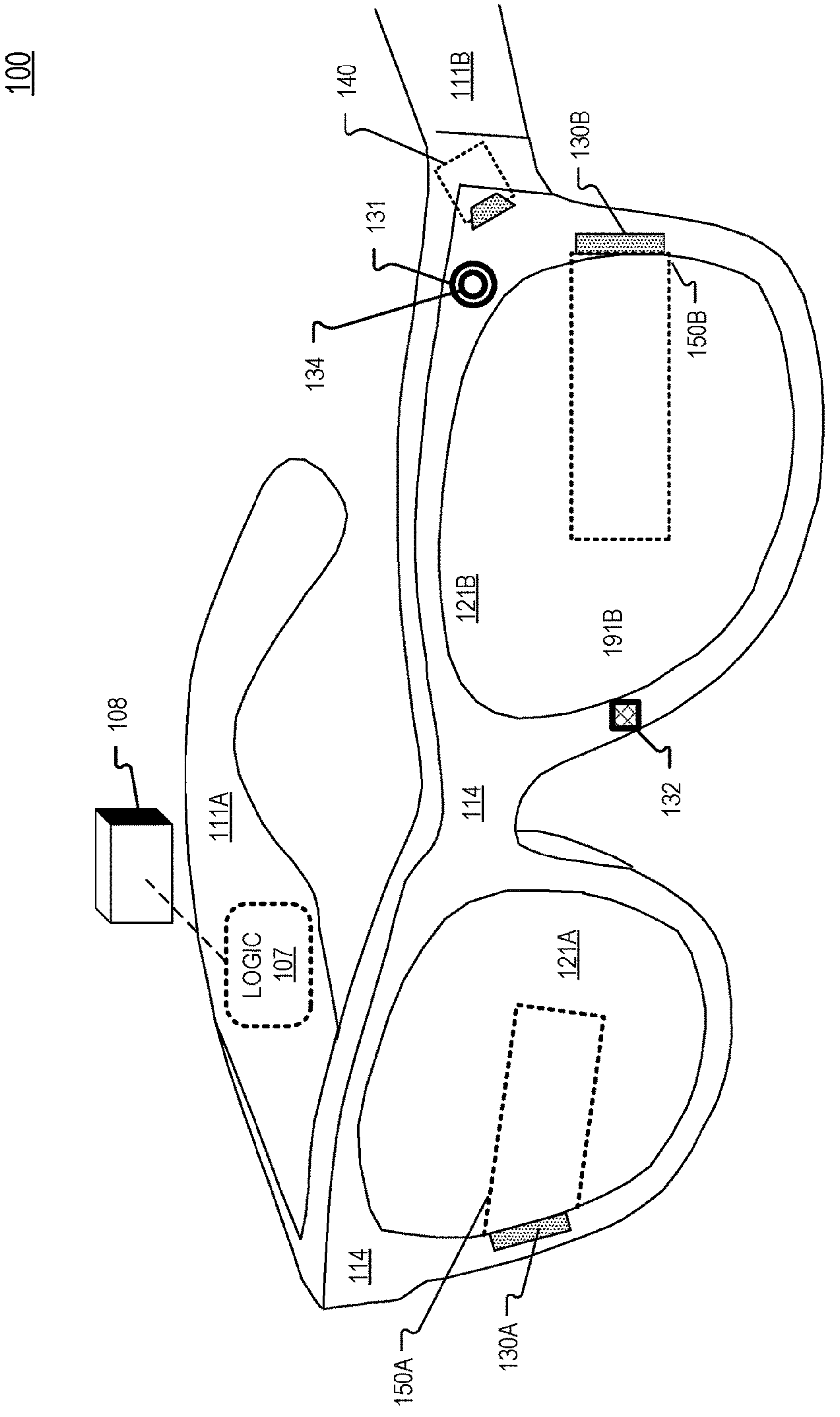
FIG. 1 illustrates a head mounted display (HMD) that may include an adjustable aperture for one or more cameras of an imaging system, in accordance with an embodiment of the disclosure.

Embodiments of an adjustable optical aperture for an imaging system are described herein. In the following description, numerous specific details are set forth to provide a thorough understanding of the embodiments. One skilled in the relevant art having the benefit of this disclosure will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

According to various embodiments, an optical aperture for an imaging system is configured to be tunable or otherwise adjustable, such that a size of the aperture can be changed in accordance with a current lighting condition (e.g., an amount of ambient light) and/or based on other factors. Thus, the quality of an image (generated by the imaging system) can be improved by changing the size of the aperture to be wider or narrower to thereby control an amount of light that passes through the aperture.

Adjusting the size of the aperture based on the lighting condition improves the user experience in various scenarios. For example, increasing the aperture size improves the quality of the image during low lighting conditions, and decreasing the aperture size improves the quality of the image during bright lighting conditions. Moreover, adjusting the aperture size correspondingly enables the adjustment of the depth of field.

The adjustable aperture of various embodiments may be used for a camera of augmented reality (AR), virtual reality (VR), mixed reality (MR), etc. systems. The adjustable aperture of various embodiments may also be used for other types cameras or imaging systems, such as wearable cameras, handheld cameras, stationary cameras, cameras for residential, commercial, scientific, etc. applications, and so forth.

The adjustable aperture of various embodiments may be fast tunable and may be provided for low power camera implementations that seek to reduce the power consumption, size, and complexity associated with controlling a size of an aperture. For example, and as will be described further below, an actuator can be provided to actuate/move optical elements at small strokes-such small strokes advantageously involve lower power consumption and faster speed, since large displacement distances are not involved.

FIG. 1 illustrates a head mounted display (HMD) 100 that may include an adjustable aperture for one or more cameras of an imaging system, in accordance with an embodiment of the disclosure. The HMD 100 includes a frame 114 coupled to arms 111A and 111B. Lens assemblies 121A and 121B are mounted to the frame 114. The lens assemblies 121A and 121B may include a prescription lens matched to a particular user of the HMD 100. The illustrated HMD 100 is configured to be worn on or about a head of a wearer of the HMD 100, and is one example of a head mounted device.

In the HMD 100 illustrated in FIG. 1, each lens assembly 121A/121B includes a display waveguide 150A/150B to direct image light generated by displays 130A/130B to an eyebox region for viewing by the user of the HMD 100. The displays 130A/130B may include a beam-scanning display that includes a scanning mirror, for example. While the HMD 100 is illustrated as a head mounted display, implementations of the disclosure may also be utilized on head mounted devices (e.g. smartglasses) that do not necessarily include a display.

The lens assemblies 121A and 121B may appear transparent to the user to facilitate augmented reality (AR) or mixed reality (MR) to enable the user to view scene light from the environment around them while also receiving image light directed to their eye(s) by, for example, the waveguides 150. The lens assemblies 121A and 121B may include two or more optical layers for different functionalities such as display, eye-tracking, and optical power. In some embodiments, image light from the display 130A or 130B is only directed into one eye of the wearer of HMD 100. In an embodiment, both displays 130A and 130B are used to direct image light into the waveguides 150A and 150B, respectively.

The frame 114 and arms 111 may include supporting hardware of the HMD 100 such as processing logic, wired and/or wireless data interface for sending and receiving data, graphic processors, and one or more memories for storing data and computer-executable instructions. The processing logic may include circuitry, logic, instructions stored in a machine-readable storage medium, ASIC circuitry, FPGA circuitry, and/or one or more processors. In one embodiment, the HMD 100 may be configured to receive wired power. In one embodiment, the HMD 100 is configured to be powered by one or more batteries. In one embodiment, the HMD 100 may be configured to receive wired data including video data via a wired communication channel. In one embodiment, the HMD 100 is configured to receive wireless data including video data via a wireless communication channel.

FIG. 1 illustrates one or more example cameras 131 (collectively referred to as the camera(s) 131) that may be disposed at different positions on the HMD 100, such as at various positions on the frame 114. In different implementations, more or fewer cameras 131 may be implemented in a head mounted device. The camera 131 is configured to generate images of the environment around the user of the HMD 100.

For example, each camera 131 may be an externally facing camera (e.g., facing away from the user) that generates images of the scene being viewed by the user through the lens assemblies 121A and 121B, of the scene to the sides of the user (which may not necessarily be viewable by the user through the lens assemblies 121A and 121B), of the scene behind the user, etc.

The HMD 100 may also include one or more sensors 132 (collectively referred to as the sensor(s) 132) that may be disposed at different positions on the HMD 100, such as at various positions on the frame 114. The sensor(s) 132 of various embodiments may include one or more light sensors configured to sense an amount of ambient light (including visible light) of the environment around the HMD 100. Such ambient light may include natural light and/or artificial light. Thus, the amount of light sensed by the sensor 132 may be indicative of the current lighting condition of the environment around the HDM 100, such as bright lighting during daytime, low lighting during night time, indoor lighting levels, etc.

The camera 131 may have an aperture 134 that is adjustable in size so as to be widened or narrowed (in the manner that will be described later below) based on the amount of ambient light sensed by the sensor 132 and/or based on other factors. In this manner, the amount of light received by the camera 131 for imaging purposes can be controlled. The aperture 134 may be provided by a lens and/or other small-diameter optical element(s) that will be described later below. In some aspects, a "small-diameter" optical element refers to an optical element that has or provides an adjustable diameter (e.g., an adjustable aperture size) that is nominally 3 millimeters or less, as an example.

The HMD 100 may include control logic 107 communicatively coupled to the camera 131 (including the aperture 134) and the sensor 132. According to various embodiments, the control logic 107 may be configured to evaluate the amount of light being sensed by the sensor 132, and to control the adjustment of the size of the aperture 134 based on the amount of light and/or based on other factors (including depth of field considerations).

The control logic 107 may be disposed on the frame 114 of the HMD 100, or elsewhere on or off the HMD 100. The control logic 107 and the camera 131 of various embodiments may form part of an imaging system 108 that performs operations related to processing images captured by the camera 131 and processing/generating related signals, data, instructions, etc. Such images may be presented to the user of the HMD 100 via the displays 130A/130B, presented on some other device, recorded and stored for playback, or used for various other purposes. Components of the imaging system 108 may be located on the HMD 100 and/or remotely from the HMD 100.

The HMD 100 may further include at least another camera 140, which may also form part of the imaging system 108 in some embodiments. The camera 140 may be configured for eye-tracking, for example by being inward facing towards the user so as to capture images of the eye of the user. With eye-tracking, light sources (not shown in FIG. 1) may direct non-visible light towards the eye of the user, and the camera 140 may be configured to receive the reflected non-visible light so as to generate an image of the eye. The non-visible light may include near-infrared (near-IR) or infrared light (e.g., the camera 140 is an IR camera). Processing logic (e.g., the logic 107 and/or other logic) of the HMD 100 may then process the generated image to determine a gaze direction, etc. of the user for eye-tracking purposes.

The camera 140 of some embodiments may be analogous to the camera 131 described above in some, in that the camera 140 may also have an adjustable aperture. The size of the aperture of the camera 140 may be adjusted, for example, to control an amount of non-visible light that is being received by (e.g., passed to) the imaging optics of the camera 140. Such control of the aperture size of the camera 140 may also be based on an amount of light being sensed by a light sensor. For example, an IR light sensor (analogous to the sensor 132 but facing inwardly towards the user) may be disposed on the frame 114 and configured to determine an amount of non-visible light that is being reflected from the eye of the user. Based on the detected amount of reflected non-visible light, the control logic 107 may widen or narrow the size of the aperture of the camera 140, so as to correspondingly increase or decrease the amount of non-visible light that is being passed to the imaging optics of the camera 140, for purposes of improving the quality of the images of the eye that are being generated.

While the foregoing examples have described an adjustable aperture in the context of such aperture being used for or being part of a camera, some embodiments may also provide an adjustable aperture for one or both of the lens assemblies 121A and 121B. For example, the lens assembly 121A/121B may have an aperture with an adjustable size, such that the amount of light that passes through the lens assembly 121A/121B can be controlled by widening or narrowing the size of the aperture. Such control of the size of the aperture of the lens assembly 121A/121B may be performed using the techniques described later below.

Figure 2:
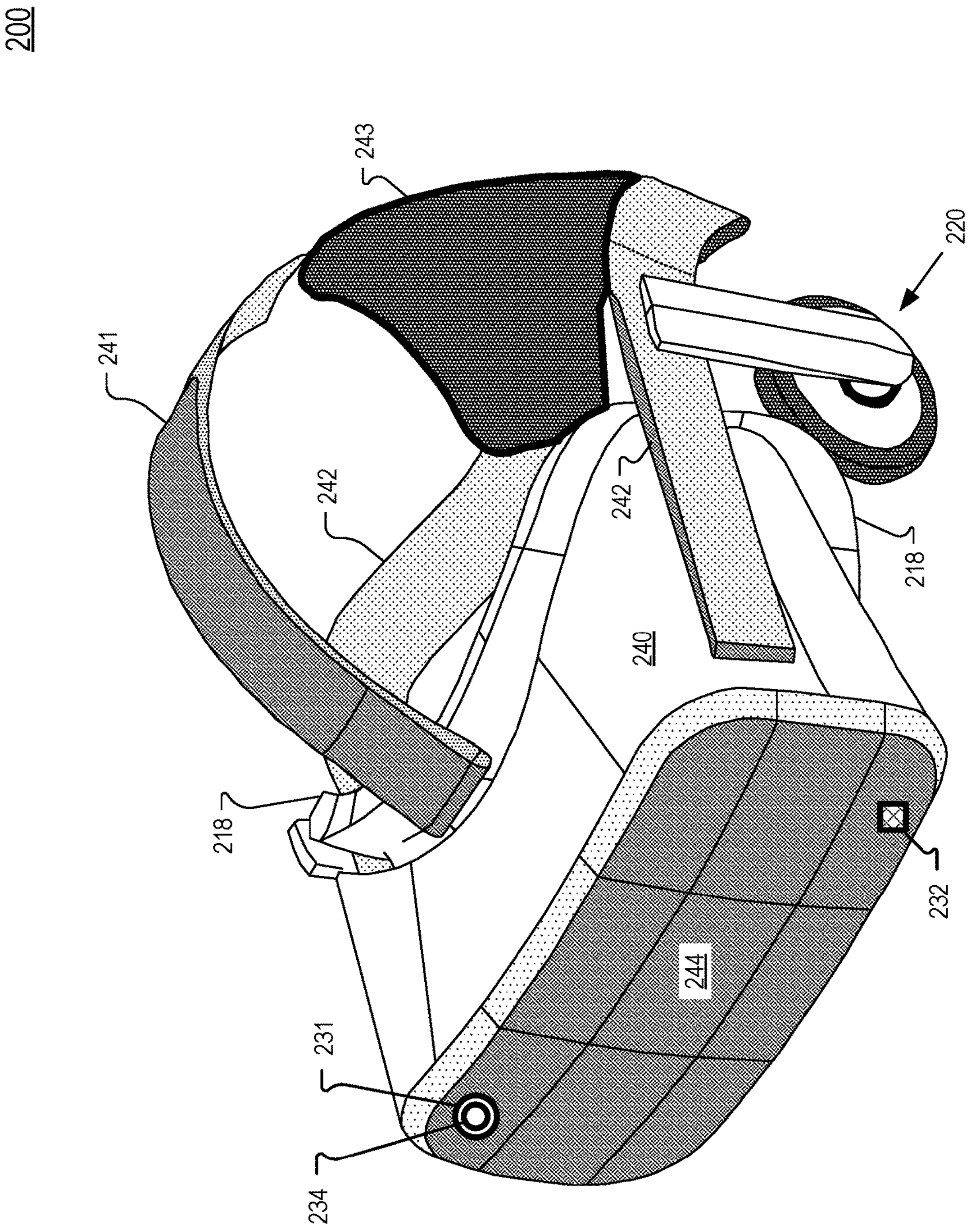
FIG. 2 illustrates another head mounted display (HMD) that may include an adjustable aperture for one or more cameras of an imaging system, in accordance with an embodiment of the disclosure.

FIG. 2 illustrates another HMD 200 that may include an adjustable aperture for one or more cameras of an imaging system, in accordance with aspects of the present disclosure. The HMD 200 may be used for virtual reality (VR) implementations, for example, and may include or be coupled to an imaging system such as the imaging system 108 and control logic 107 depicted for the HMD 100 of FIG. 1.

The illustrated example of the HMD 200 is shown as including a viewing structure 240, a top securing structure 241, a side securing structure 242, a rear securing structure 243, and a front rigid body 244. In some examples, the HMD 200 is configured to be worn on a head of a user of the HMD 200, where the top securing structure 241, side securing structure 242, and/or the rear securing structure 243 may include a fabric strap including elastic as well as one or more rigid structures (e.g., plastic) for securing the HMD 200 to the head of the user. The HMD 200 may also optionally include one or more earpieces 220 for delivering audio to the ear(s) of the user of the HMD 200.

The illustrated example of the HMD 200 also includes an interface membrane 218 for contacting a face of the user of the HMD 200, wherein the interface membrane 218 functions to block out at least some ambient light from reaching the eyes of the user of the HMD 200.

The example HMD 200 may also include a chassis for supporting hardware of the viewing structure 240 of HMD 200 (chassis and hardware not explicitly illustrated in FIG. 2). The hardware of the viewing structure 240 may include any of processing logic, wired and/or wireless data interface for sending and receiving data, graphic processors, and one or more memories for storing data and computer-executable instructions, which may form part of the imaging system and/or other sub-system of the HMD 200. In one example, the viewing structure 240 may be configured to receive wired power and/or may be configured to be powered by one or more batteries. In addition, the viewing structure 240 may be configured to receive wired and/or wireless data including video data.

The viewing structure 240 may include a display system having one or more electronic displays for directing light to the eye(s) of a user of the HMD 200. The display system may include one or more of a liquid crystal display (LCD), an organic light emitting diode (OLED) display, or micro-LED display for emitting light (e.g., content, images, video, etc.) to the user of HMD 200.

In some examples of the HMD 200, one or more sensors may be included on the viewing structure 240 and/or other part of the HMD 200. In some aspects, the sensor may be a camera (having an adjustable aperture in some embodiments) for capturing image(s) of an eye of the user of HMD 200, in a manner analogous to the camera 140 described above with respect to FIG. 1, for eye-tracking purposes. In other aspects, the sensor may be a camera 231 having an adjustable aperture 234, analogous to the camera 131 and aperture 134 described above with respect to FIG. 1. Examples of such camera or sensor may include but not be limited to a simultaneous localization and mapping (SLAM) sensor, such as an optical sensor, rangefinder, LiDAR sensor, sonar sensor, etc., for mapping the user and/or environment surrounding the HMD 200, or any other type of camera suitable to capture an image.

Also in a manner analogous to the sensor 132 of FIG. 1, the HMD 200 of FIG. 2 may include one or more sensors 232 (collectively referred to as the sensor(s) 232), such as light sensors, located on the viewing structure 240 and/or other part of the HMD 200. As with the sensor 132 of FIG. 1, the sensor 232 may be used to detect/determine a level of ambient light or other sensed light, so that the determined amount of light can be used by logic of the HMD 200 to adjust the size of the aperture(s) of the camera(s) of the HMD 200, for purposes of controlling the amount of light that passes to the imaging optics of such camera(s) so as to improve the quality of the images captured by the camera(s).

The sensors 132 and 232 may be components that are separate/discrete from the respective cameras 131 and 231 in some embodiments. In other embodiments, the sensors 132 and 232 may be components that are integrated/included amongst the other components of the respective cameras 131 and 231.

Furthermore, the examples described above have been in the context of the sensors 132 and 232 being light sensors. In various embodiments, the sensors 132 and 232 (and/or other sensors on the HMDs) may include distance sensors (e.g., for range-finding operations). For instance, and as previously explained above, the size of an aperture is related to or otherwise affects the depth of field of a camera. Hence, a distance sensor may be provided in some embodiments of the HMDs, so as to determine the distance between the camera and an object being imaged by the camera.

For example, if portrait photography is being performed, then the distance sensor may determine the relatively shorter distance between the camera and the object, so as to generate a distance measurement that is usable by the control logic 107 to adjust the aperture of the 134 of the camera 131 to a wider aperture size for a shallower depth of field. If landscape photography is being performed, then the distance sensor may determine the relatively larger distance between the camera and the scenery, so as to generate a distance measurement that is usable by the control logic 107 to adjust the aperture of the 134 of the camera 131 to a narrower aperture size for a deeper depth of field.

In still other embodiments, the size of the aperture of the camera 131 or 231 may be adjusted based on characteristics of the image(s) that have been generated, alternatively or additionally to information provided by the above-described sensors. For example, the imaging system 108 may analyze a generated image (such as by using image processing) and determine that the image is too dark, is too bright, has a blurred foreground or background, or otherwise has some non-optimal characteristic that could be improved by tuning/adjusting the aperture. Based on this analysis/determination, the imaging system 108 may perform a corrective adjustment of the size of the aperture, so as to increase/decrease the amount of light passing through the aperture, to change (e.g., increase/decrease) the depth of field, etc.

The embodiments described above with respect to FIG. 1 and FIG. 2 have been in the context of an adjustable aperture for an imaging system of an HMD. According to other embodiments, an adjustable aperture can be provided for an imaging system of other types of devices, including an adjustable aperture for a camera with a small form factor (e.g., has a small-diameter lens and/or relatively small optical elements).

FIGS. 3A-3F illustrate example devices that have an imaging system with an adjustable aperture. In FIGS. 3A-3F, the imaging system of the various devices may include components similar or otherwise analogous to those described above with respect to FIG. 1 and FIG. 2, such as a camera, an adjustable aperture, one or more sensors that generate data usable to adjust the aperture, control logic, etc. and their corresponding sub-components.

Figure 3A:
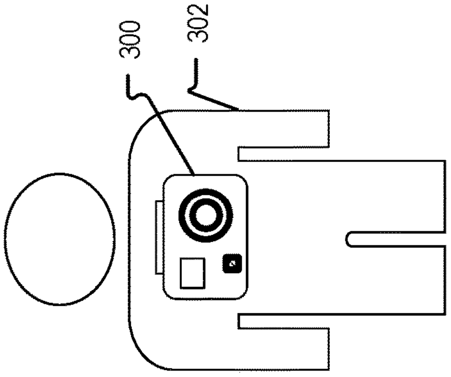
FIGS. 3A-3F illustrate example devices that have an imaging system with an adjustable aperture, in accordance with an embodiment of the disclosure.

In FIG. 3A, a wearable camera 300 is worn by a user 302. The camera 300 may be worn on the head or other body part of the user 302, such as on a hat, shirt, etc. of the user 302. Examples of this implementation of FIG. 3A may be an action camera, body camera, etc.

Figure 3B:
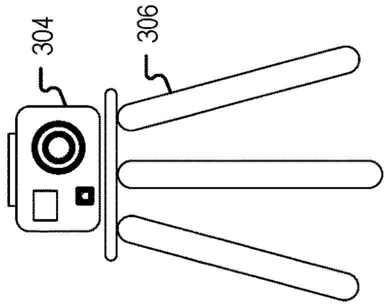

In FIG. 3B, a camera 304 is mounted on a fixed structure 306. The structure 306 may be a tripod, wall of a building, tower, stationary device, etc. Examples of this implementation of FIG. 3B may include a trail camera, a news/movie camera, a building surveillance camera, a traffic camera, a camera mounted on a desktop personal computer (PC), etc.

Figure 3C:
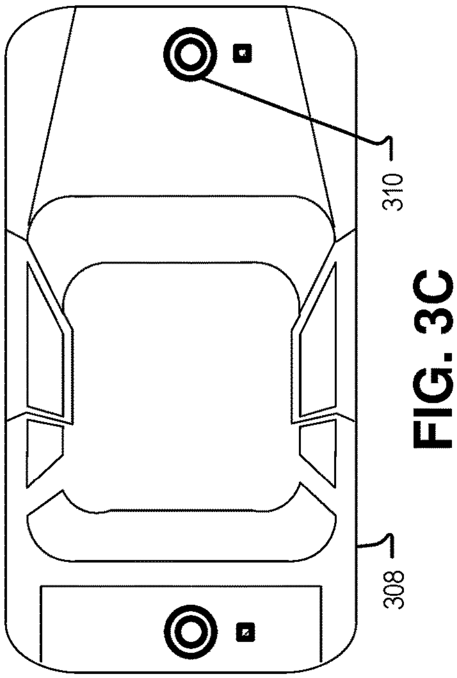

In FIG. 3C, a vehicle (such as a car) 308 may include one or more cameras 310 and corresponding sensors (e.g., light and distance sensors). The cameras 310 may include a rear-facing camera (including a backup camera), a front-facing camera (including a dash camera), a security camera, and other types of vehicle cameras.

Figure 3D:
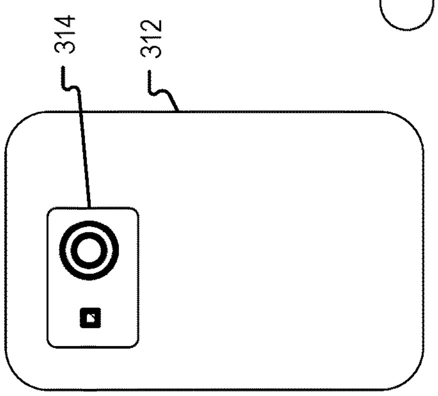

FIG. 3D depicts a mobile communication device 312 (such as a mobile telephone, a laptop computer, other type of handheld device, etc.) having a camera 314. The device 312 may have the camera located on a back surface of the device 312, as would be the case with many mobile telephones.

Figure 3E:
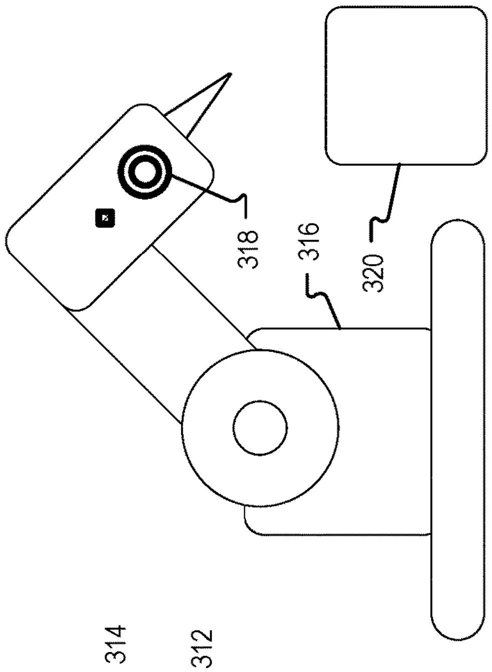

FIG. 3E depicts equipment 316 having a camera 318. The equipment 318 may be industrial, scientific, medical, consumer, etc. equipment configured to operate on an object 320. The object 320 may be a workpiece, a patient, an item being manufactured, or other type of object wherein the camera 318 is used to image the object for purposes of controlling or otherwise operating the equipment 316.

Figure 3F:
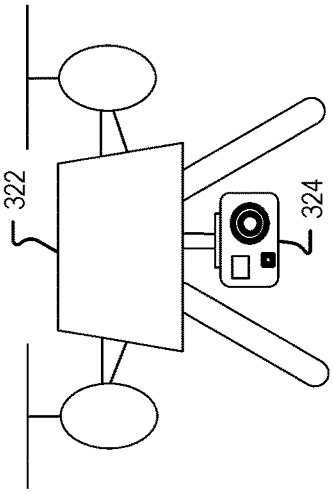

In FIG. 3F, a remotely controlled device 322 is fitted with a camera 324. The device 322 may be an aerial drone, a terrestrial robot, or other type of remotely controlled mobile device that uses the camera 324 to capture images for recording/transmission to a user, for navigation of the device 322, or for other uses.

The embodiments shown and described with respect to FIGS. 3A-3F are just some of the possible examples of devices that may use an imaging system having an adjustable aperture. For the sake of simplicity of explanation, various embodiments will be described hereinafter in the context of head mounted device such a HMD having an imaging system as depicted in the examples of FIGS. 1 and 2, and it is understood that such description can be analogously applied to the devices of FIGS. 3A-3F and/or other devices that use or include imaging systems.

According to some embodiments, adjustability of an aperture can be based on reflection and index matching.

Figure 4A:
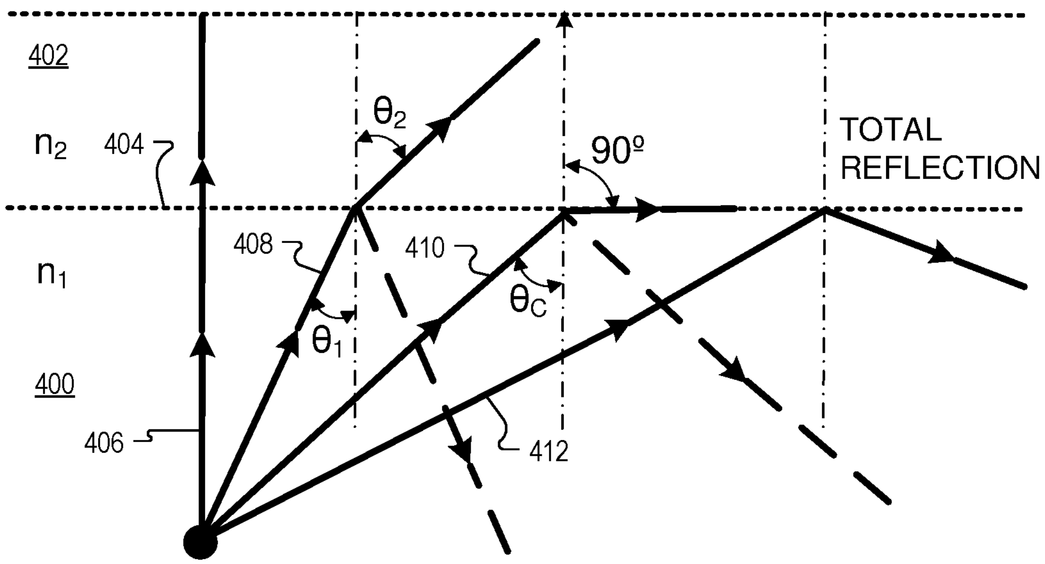
FIGS. 4A and 4B illustrate examples of reflection of light and index matching, in accordance with an embodiment of the disclosure.
Figure 4B:
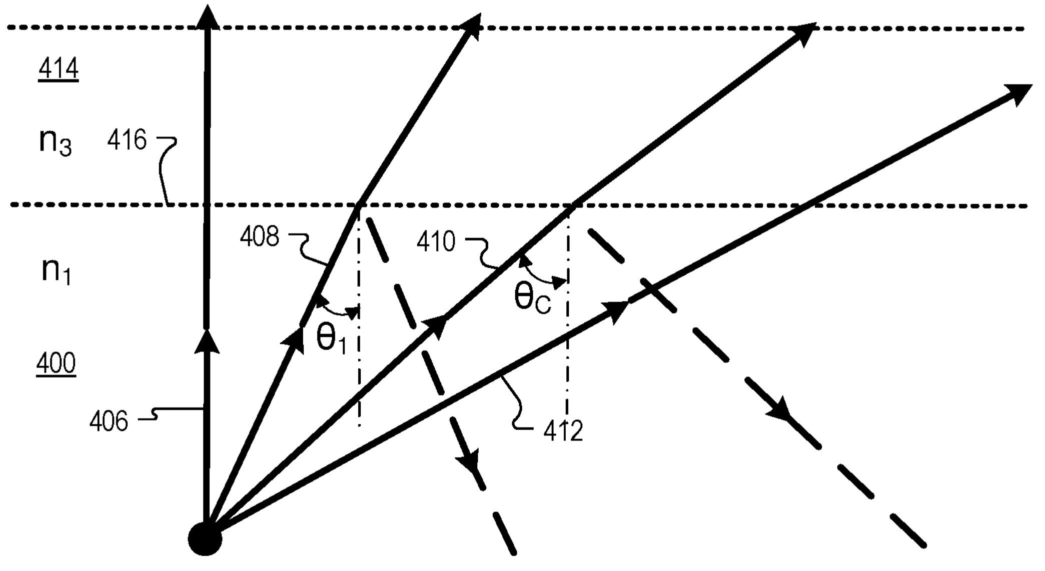

FIGS. 4A and 4B illustrate examples of reflection of light and index matching, in accordance with an embodiment of the disclosure.

In FIG. 4A, a first medium 400 has a refractive index $n_1$, and a second medium 402 has a refractive index $n_2$ that is lower than the refractive index $n_1$ (e.g., there is no index matching material present). The first medium 400 interfaces with the second medium 402 at an interface 404. A critical angle is shown at $\theta_C$, and FIG. 4A depicts the behavior of light rays at increasing angles of incidence.

For example light rays propagating through the first medium 400 and that are incident on the interface 404, at angles less than the critical angle $\theta_C$, pass into the second medium 402. As illustrated, a light ray 406 (incident on the interface 404 at an angle of) 0° passes into the second medium 402, and a light ray 408 (incident on the interface 404 at an angle $\theta_1<\theta_C$) also passes into the medium 402. With respect to the light ray 408, the light passes into the second medium 402 and is refracted at an angle $\theta_2$, which differs from the angle $\theta_1$.

A light ray 410 is incident on the interface 404 at an incident angle that is equal to the critical angle $\theta_C$. As a result, the light ray 410 does not enter the second medium 402 and is instead refracted along the interface 404 at an angle of 90°.

A light ray 412 is incident on the interface 404 at an incident angle greater than the critical angle $\theta_C$. Accordingly, there is total reflection of the light ray 412 at the interface 404. Thus, FIG. 4A depicts a situation in which total internal reflection (TIR) of the light ray 412 occurs when the incident angle is greater than the critical angle 404, when light propagates from a material of higher refractive index to a material of lower refractive index.

FIG. 4B illustrates a situation in which index matching has been performed, where a third medium 414 interfaces with the first medium 400 at an interface 416, and the third medium 414 has a refractive index $n_3$ that is closer to, or the same, as the refractive index $n_1$.

The index matching of FIG. 4B is being used to change the total reflection, and thus control the passing of the light through the third medium 414. For example, the light rays 410 and 412 now go through the interface 416 and pass into/through the third medium 414, with reduced or no reflection. Some refraction may be present or absent dependent on the closeness of the index matching. Analogously, the light rays 406 and 408 go through the interface 416 and pass into/through the third medium 414 with reduced or no reflection.

Figure 5:
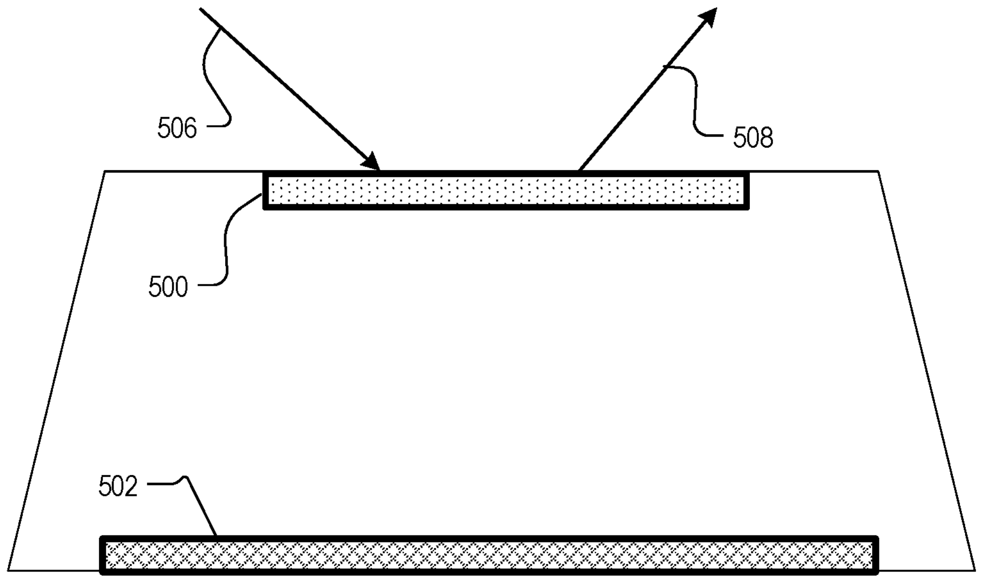
FIG. 5 illustrates light incident on an adjustable aperture and sensed by a sensor, in accordance with an embodiment of the disclosure.

FIG. 5 illustrates light incident on an adjustable aperture 500 and sensed by a sensor 502, in accordance with an embodiment of the disclosure. For example, the adjustable aperture 500 may be the aperture 134/234, and the sensor 502 may be the sensor 132/232 of FIGS. 1 and 2, respectively. Notably, in some implementations adjustable aperture 500 may not necessarily be the first optical element encountered by light 506 and adjustable aperture 500 is not necessarily disposed on the top of a given optical assembly. The sensor 132/502 may sense/determine the amount of light 506 incident on the adjustable aperture 500. The light (e.g., a light ray) 506 is incident on the adjustable aperture 500, and some light (e.g., a light ray 508) may be totally reflected from the adjustable aperture 500 (and so does not enter the aperture 500) based on the principles illustrated in the examples of FIGS. 4A and 4B. The working mechanism included in adjustable aperture 500 may also include the optical absorption functionality described below with respect to FIGS. 11 and 12. The working mechanism included in adjustable aperture 500 may include the near field coupling functionality described below in association with FIGS. 13A-15.

Figure 6:
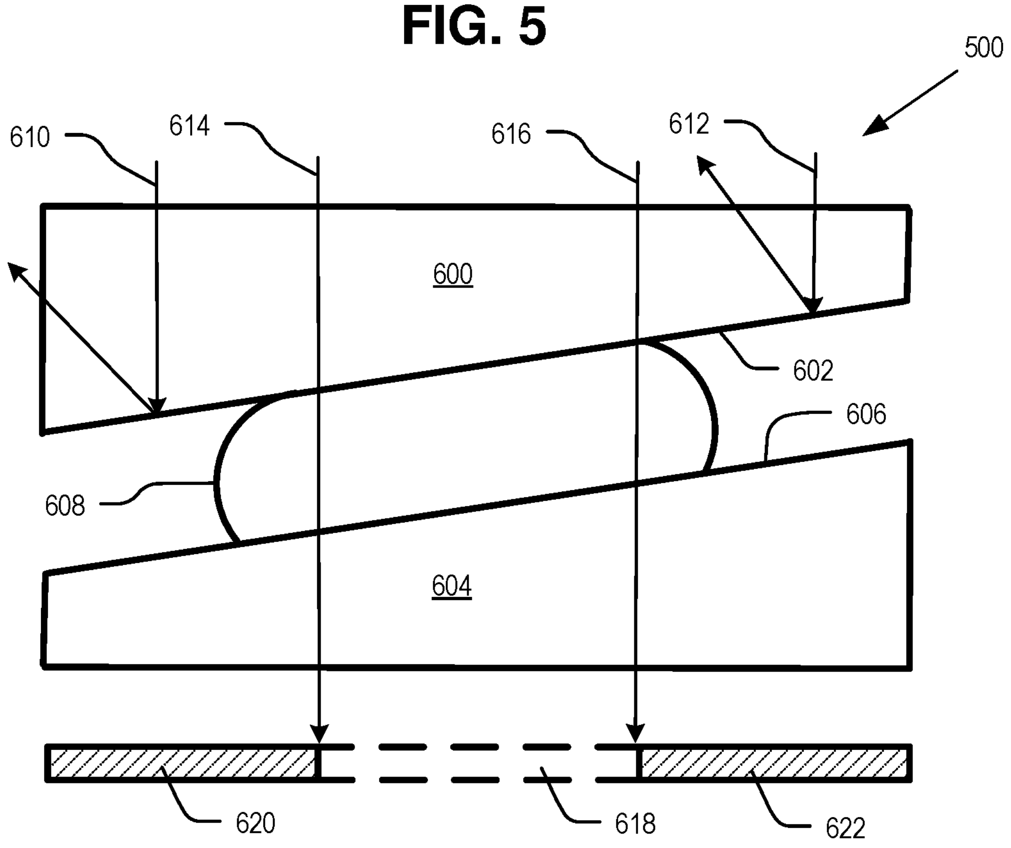
FIG. 6 illustrates further details of the adjustable aperture of FIG. 5 that operates based on index matching, in accordance with an embodiment of the disclosure.

FIG. 6 illustrates example further details of the adjustable aperture 500 of FIG. 5 that may operate based on index matching, in accordance with an embodiment of the disclosure. The adjustable aperture 500 includes a first optical layer in the form of a first plate 600 having a first surface 602, and a second optical layer in the form of a second plate 604 having a second surface 606. An incident angle for the first plate 600 may be set so as to be larger than the critical angle of light incident on the first plate 600, in a manner that will be described later below with respect to FIG. 8. The first plate 600 and the second plate 604 of some embodiments may be prisms made of glass or other transparent or semi-transparent material.

An amorphous layer 608 is disposed between the first surface 602 and the second surface 606, so as to at least partially fill a gap between the first surface 602 and the second surface 606. According to various embodiments, the amorphous layer 608 is comprised of an index matching material, such that the refractive indices of the first plate 600, the second plate 604, and the amorphous layer 608 may be substantially the same as each other and at least larger than the refractive index of air (e.g., a refractive index larger than 1). In some embodiments, the refractive index of the amorphous layer 608 may be slightly smaller than the refractive indices of the first plate 600 and the second plate 604. The first plate 600 and the second plate 604 may be comprised of a relatively denser material having a higher refractive index (n value). The amorphous layer 608 may be comprised of a soft and deformable material, such as a silicone-based gel, a polymer, a fluid, etc.

In operation, light (e.g., light rays 610 and 612) is totally reflected at locations of the first surface 602 where the amorphous layer 608 is not in contact with the two surfaces 602 and 606, thereby providing an optical stop at these locations. Air may be present at the locations where the amorphous layer 608 does not provide contact with the two surfaces 602 and 606. At the locations where there is contact between the amorphous layer 608 and the two surfaces 602 and 606, light (e.g., light rays 614 and 616) passes through the first plate 600, the amorphous layer 608, and the second plate 604, thereby effectively providing an aperture through which light can pass. An equivalent aperture is graphically represented at 618, with equivalent optical stop(s) being graphically represented at 620 and 622.

According to various embodiments, the spacing (e.g., the distance across the gap) between the first surface 602 and the second surface 604 can be varied (e.g., made wider or narrower). For example in one embodiment, the first plate 600 may remain stationary, and the second plate 604 may be moved closer to or further away from the first plate 602. In other embodiments, the second plate 604 may be kept stationary, and the first plate 600 may be moved closer to or further away from the second plate 604. In still other embodiments, both the first plate 600 and the second plate 604 may be movable towards or away from each other.

Figure 7:
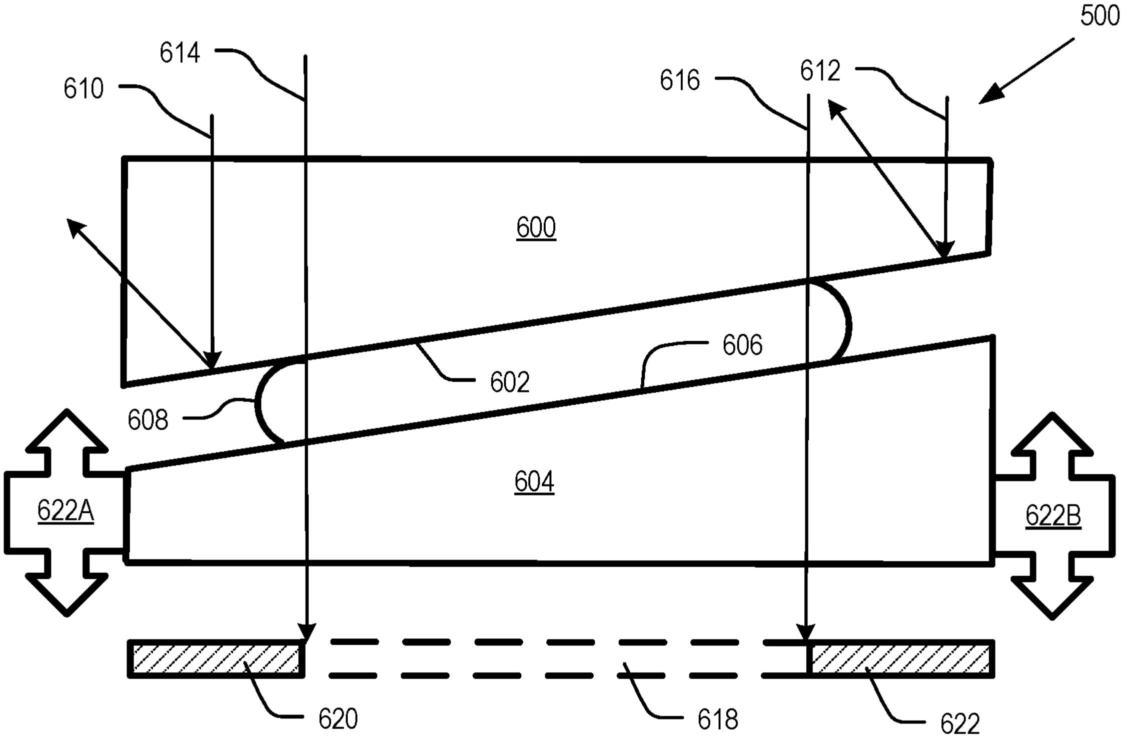
FIG. 7 illustrates the adjustable aperture of FIG. 6 being widened, in accordance with an embodiment of the disclosure.

As depicted in FIG. 7, one or more actuators 622A and 622B (collectively referred to as the actuator(s) 622) may be used to move one or both of the first plate 600 and the second plate 604. In the example of FIG. 7, the actuator 622 is coupled to the second plate 604, so as to change the position of the second plate 604 relative to the stationary first plate 602 (e.g., to move the second plate 604 up or down, in the example orientation and arrangement of FIG. 7).

This variation of the spacing between the first surface 602 and the second surface 604 results in a corresponding deformation of the amorphous layer 608. For example, when the spacing between the first surface 602 and the second surface 604 is narrowed, pressure is applied to the amorphous layer 608 to flatten/compress the amorphous layer 608 so as to increase the surface area contact of the amorphous layer 608 with the first surface 602 and the second surface 604. This flattening of the amorphous layer 608 results in a corresponding widening of the aperture through which light can pass, since there is more surface area contact between the index matched amorphous layer 608 and the surfaces 602 and 606.

In comparison, when the spacing between the first surface 602 and the second surface 604 is widened, compressive pressure on the amorphous layer 608 is reduced, thereby deforming the amorphous layer 608 so as to increase the separation of the amorphous layer from the first surface 602 and the second surface 604 (e.g., decreased surface area contact of the amorphous layer 608 with the first surface 602 and the second surface 604). This decreased surface area contact results in a corresponding narrowing of the aperture through which light can pass.

Consequently, using the actuator 622 to cause the amorphous layer 608 to contact with or separate from the surfaces 602 and 606 results in a corresponding change in the total reflection and aperture size. For example, FIG. 7 illustrates the adjustable aperture 500 being widened, in accordance with an embodiment of the disclosure. More specifically in FIG. 7, the actuator 622 has moved the second plate 604 so as to be closer to the first plate 600, so as to further flatten the amorphous layer 608. Hence, and compared to FIG. 6, there is increased surface area contact between the amorphous layer 608 and the surfaces 602 and 606 in FIG. 7, thereby resulting in a wider area of index matched materials through which light can pass through, and a smaller amount of the first surface 602 that will cause total reflection. If the preceding FIG. 6 is considered to be depicting a narrow aperture, then FIG. 7 depicts providing a relatively wider aperture, as symbolically represented in FIG. 7 by a wider equivalent aperture 618 (and correspondingly narrower optical stops 620 and 622).

According to some embodiments, the amount of stroke (e.g., displacement) and force of the actuator 622 for actuating movement of the plate(s) may be dependent on the modulus of the amorphous layer 608, the curvature of the amorphous layer 608, and/or other factors. For a relatively flat and soft amorphous material, such as a silicon-based polymer, a sufficient stroke for causing displacement may be on the order of 1 micron or less. The actuator 622 may be a provided by a microelectromechanical system (MEMS) actuator, a piezoelectric actuator, a voice coil motor, a shape memory material, or any other suitable actuator technology that provides high precision movement and position control.

Figure 8:
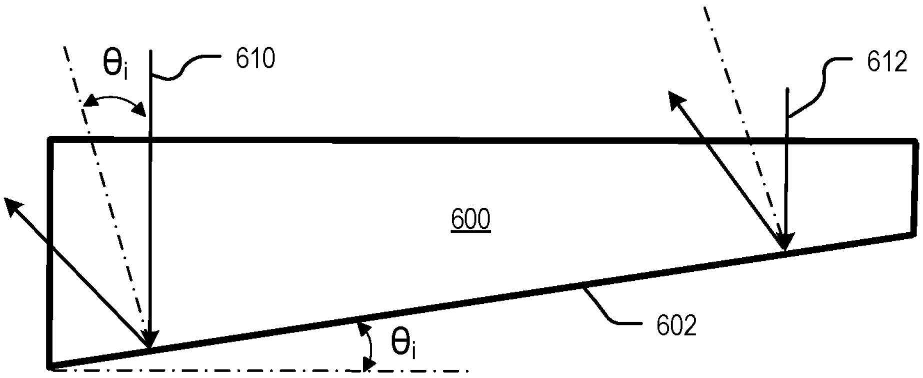
FIG. 8 illustrates a configuration of a surface of the adjustable aperture, in accordance with an embodiment of the disclosure.

FIG. 8 illustrates a configuration of a surface of the adjustable aperture 500, in accordance with an embodiment of the disclosure. More specifically, FIG. 8 shows an example sloped/angled configuration for the first surface 602 of the first plate 600 of the adjustable aperture 500.

To enable total reflection of the light rays 610 and 612, the incident angle $\theta_i$ of these rays needs to be greater than the critical angle $\theta_C$. The incident angle $\theta_i$ of various embodiments can be controlled by the angle of the first surface 602 of the first plate 600, specifically by making the angle of the first surface 602 equal to $\theta_i$ as depicted in FIG. 8.

Figure 9:
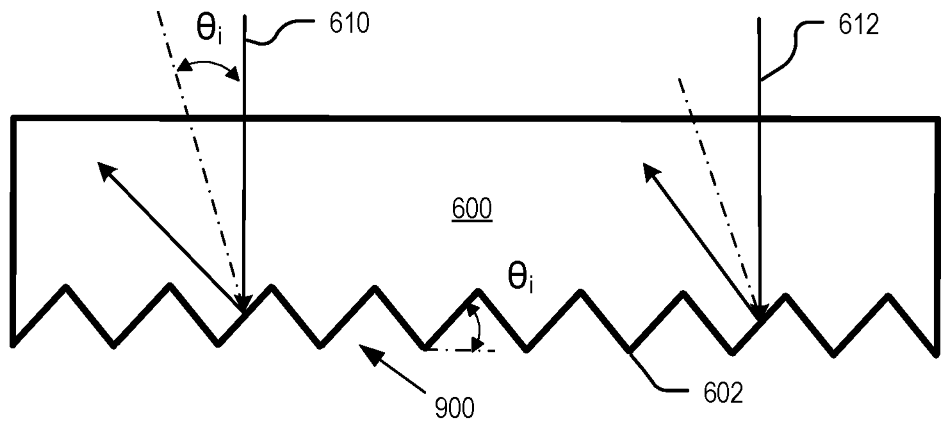
FIG. 9 illustrates another configuration of a surface of the adjustable aperture, in accordance with an embodiment of the disclosure.

In devices having constrained space, a different approach than that depicted in FIG. 8 can be taken in some embodiments for the configuration of the first surface 602. For example, FIG. 9 illustrates an optical grating 900 being formed/patterned on or otherwise provided for the first surface 602. The first surface 602 may be generally horizontal (e.g., planar rather than angular like that shown in FIG. 8), with the ridges (rulings) of the optical grating 900 being formed at the angle $\theta_i$. Hence, in the absence of index matching material, light incident on the rulings of the optical grating will experience total reflection.

Figure 10:
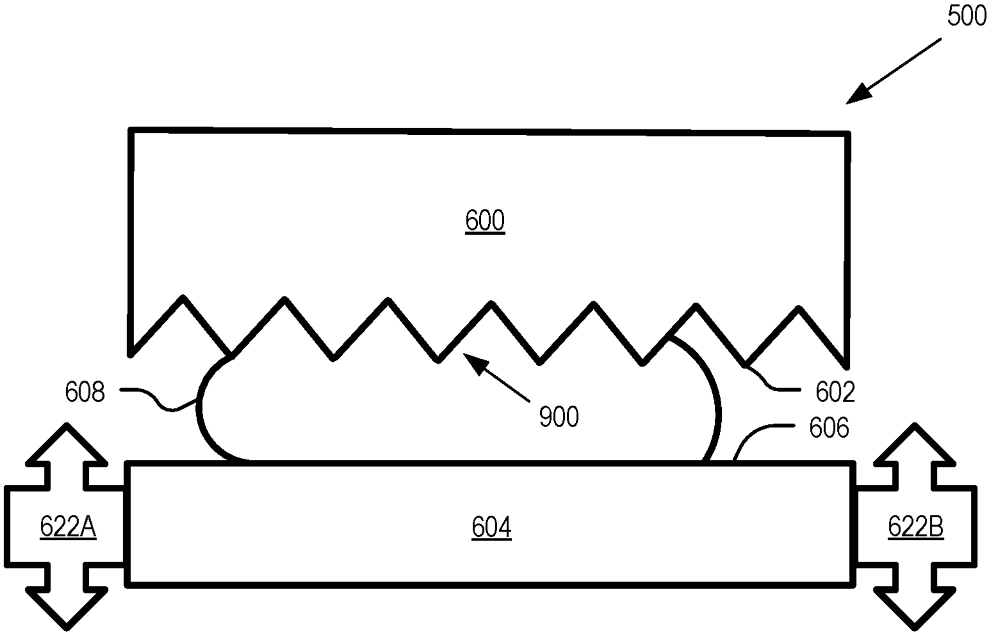
FIG. 10 illustrates the adjustable aperture having the configuration of FIG. 9, in accordance with an embodiment of the disclosure.

FIG. 10 illustrates the adjustable aperture 500 having the configuration with the optical grating 900 of FIG. 9, in accordance with an embodiment of the disclosure. In this example embodiment, the second surface 606 of the second plate 604 may also be generally planar (rather than angular) and parallel to the first surface 602. The amorphous material 608 may be disposed between the optical grating 900 and the second surface 606, and fills into the ridges of the optical grating 900. In a manner analogous to FIGS. 6 and 7, operation of the actuator 622 in FIG. 10 results in deformation of the amorphous material 608 to change the amount of surface area contact with the optical grating 900 and the second surface 606.

Figure 11:
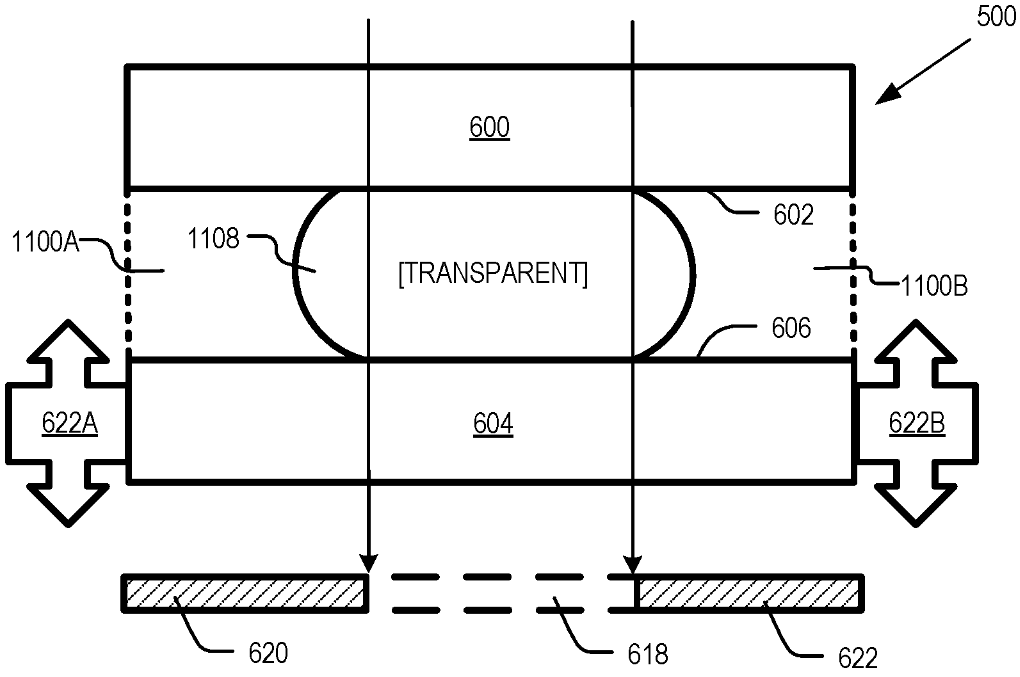
FIGS. 11 and 12 illustrate further details of the adjustable aperture of FIG. 5 that operates based on optical absorption, in accordance with another embodiment of the disclosure.
Figure 12:
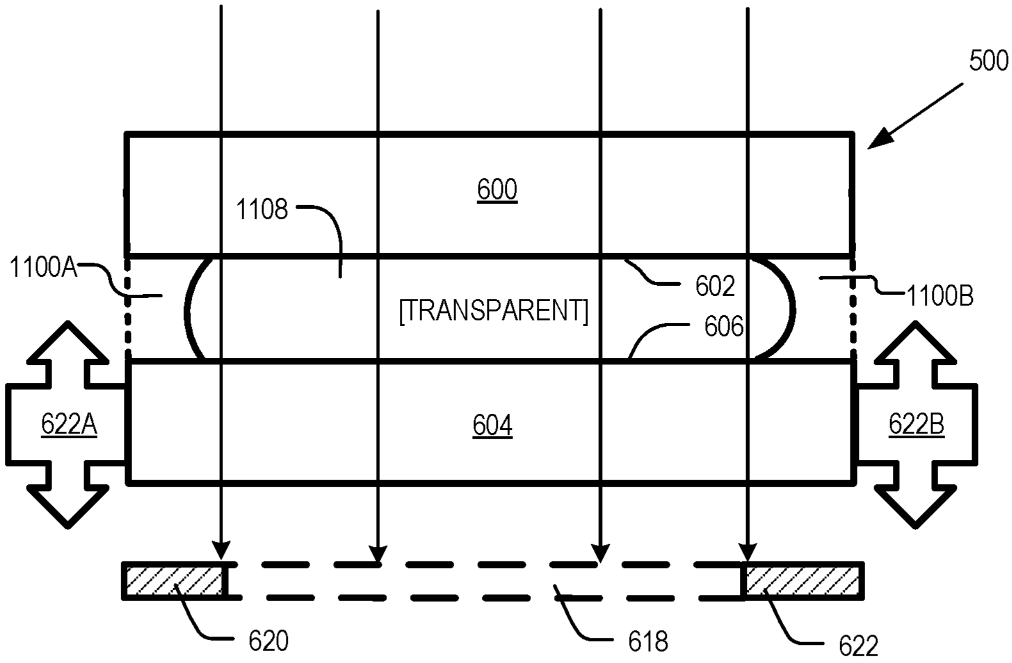

FIGS. 11 and 12 illustrate further details of the adjustable aperture 500 of FIG. 5 that operates based on optical absorption, in accordance with another embodiment of the disclosure. In such embodiment of FIGS. 11 and 12 and in comparison to the embodiments of FIGS. 6-10, both the first surface 602 of the first plate 600 and the second surface 606 of the second plate 604 may be planar non-angular surfaces. The embodiment of FIGS. 11 and 12 uses optical absorption and optical transparency to control the aperture size.

For example, an amorphous layer 1108 of FIGS. 11 and 12 may be comprised of an optically transparent deformable material, such as optically transparent silicone, polymer, fluid, etc. The amorphous layer 1108 provides the optical aperture through which light can pass, while optical stop material 1100A and 1100B (collectively referred to as the optical stop material 1100) is also present in the space/void(s) between the first surface 602 and the second surface 606, alongside of or otherwise at least partially surrounding the amorphous layer 1108. The optical stop material 1100 may also be amorphous and deformable, and may include dye or other ingredient/component that is optically absorbent. In an alternative embodiment, the optical stop material 1100 may be optically reflective.

In operation, the actuator 622 drives the second plate 604 (for example) to move closer to or further away from the first plate 600, so as to cause the transparent amorphous layer 1108 to deform, thereby changing the size of the aperture. The optical stop material 1100 fills into voids between the first surface 602 and the second surface 604 in response to the deformation, and blocks light transmission at regions outside of the aperture (e.g., outside of the amorphous layer 1108, which is transparent in this embodiment). FIG. 12 depicts a widening of the size of the aperture (compared to what is depicted in FIG. 11), as a result of the actuator 622 moving the second plate 604 closer to the first plate 600 to deform the amorphous layer 1108.

In embodiments wherein the optical stop material 1100 uses a dye, surface engineering or some other surface treatment, such as coating or texturing, can be provided on one or both of the surfaces 602 and 606 to improve the wetting of the dye on the first surface 602 and the second surface 604.

Figure 13A:
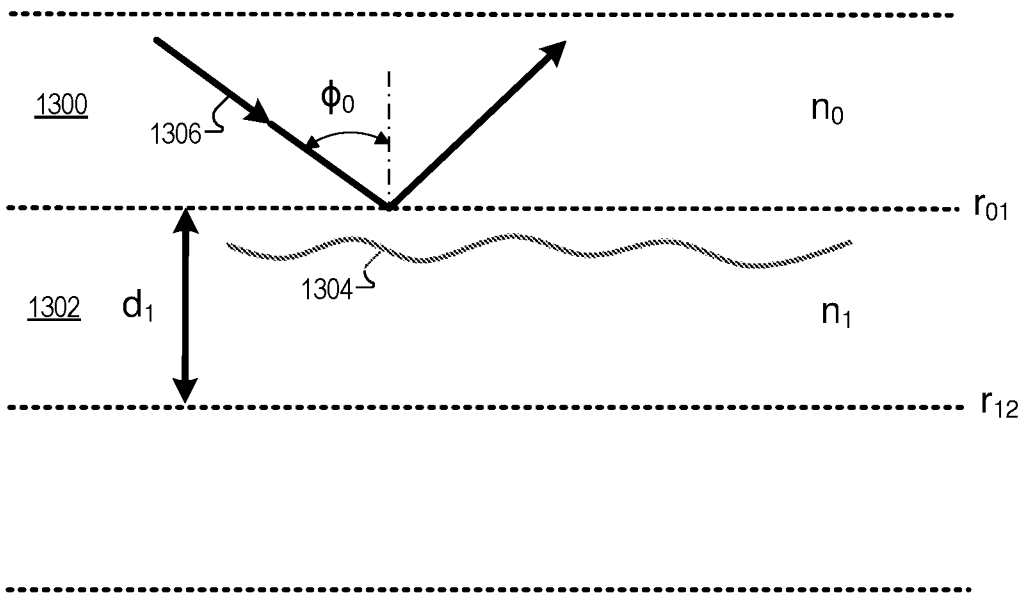
FIGS. 13A and 13B illustrate examples of near field coupling, in accordance with an embodiment of the disclosure.
Figure 13B:
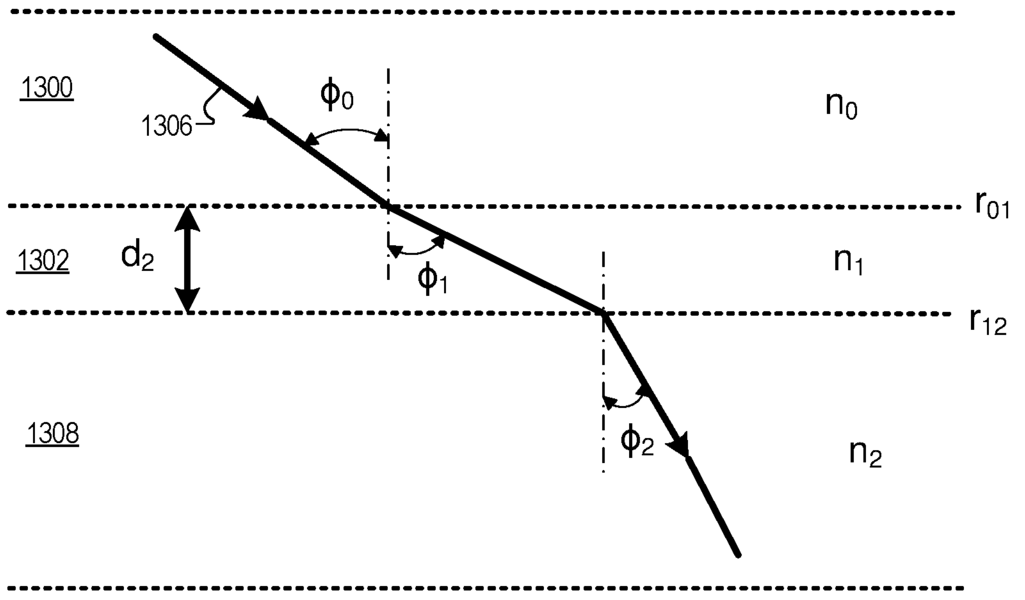

FIGS. 13A and 13B illustrate examples of near field coupling, in accordance with an embodiment of the disclosure. In FIG. 13A, there is a first medium 1300 (*no*) and a second (rarer) medium 1302 ($n_1$). An electromagnetic field penetrates into the medium 1302 in the form of an evanescent wave 1304. The penetration depth of the electromagnetic field may be in the order of a wavelength, and the strength of the electromagnetic field decays exponentially. When a gap of distance $d_1$ of the medium 1302 (between the interfaces $r_{01}$ and $r_{12}$) is large (e.g., much larger than the wavelength), total reflection of a light ray 1306 (incident on the interface $r_{01}$ at an angle $\phi_0$) dominates.

In FIG. 13B, if a third medium 1308 ($n_2$) is placed close enough (e.g., around a wavelength or a few wavelengths of light ray 1306) to the first medium 1300 ($n_0$), there will be near field tunneling across the small gap of distance $d_2$ of the second medium 1302. Hence, the light ray 1306 is coupled into the third medium 1308 from the first medium 1300, by passing through the second medium 1302 and the interfaces $r_{01}$ and $r_{12}$ (at angles $\phi_1$ and $\phi_2$), thereby resulting in near field coupling. The near field coupling strength and efficiency may increase nearly exponentially as the distance $d_2$ between the first medium 1300 and third medium 1308 is decreased.

Figure 14:
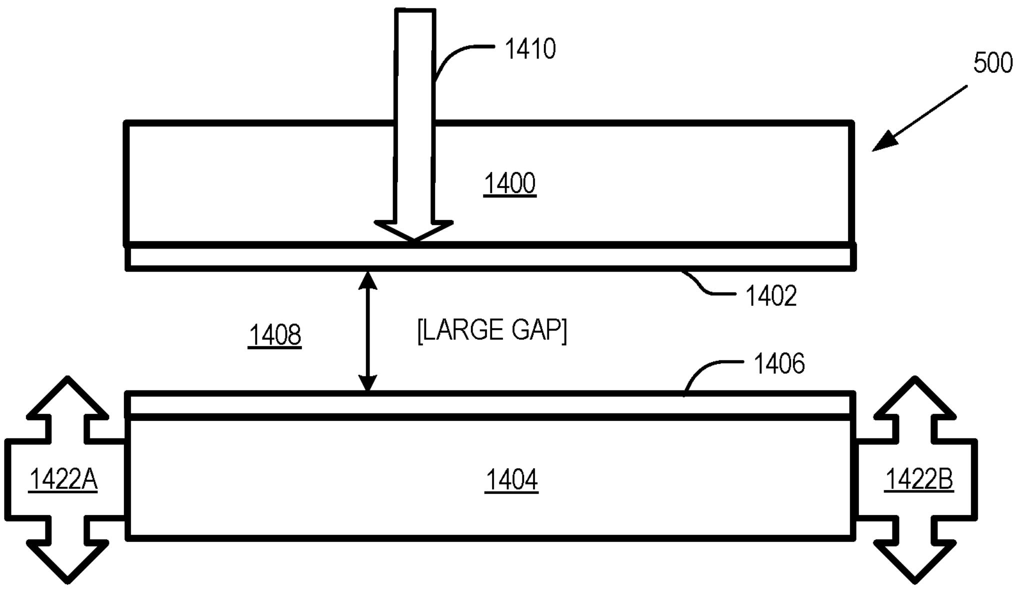
FIGS. 14 and 15 illustrate further details of the adjustable aperture of FIG. 5 that operates based on the near field coupling depicted in FIGS. 13A and 13B, in accordance with an embodiment of the disclosure.
Figure 15:
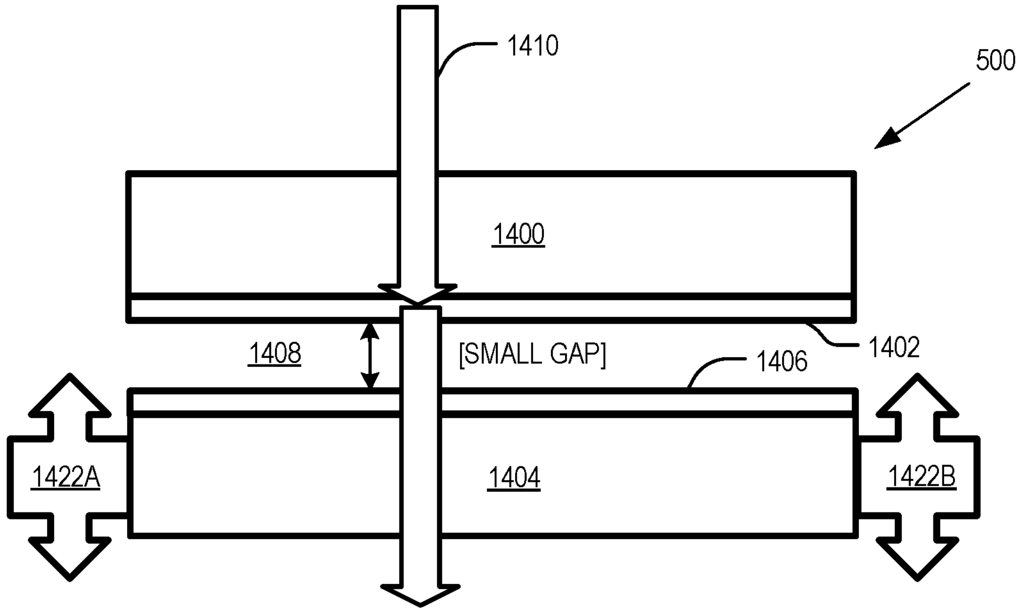

Thus, the transmission of light may be controlled by changing the distance across the gap between two media, for a near field coupling technique. FIGS. 14 and 15 illustrate further details of the adjustable aperture 500 of FIG. 5 that operates based on the near field coupling depicted in FIGS. 13A and 13B, in accordance with an embodiment of the disclosure. Specifically, FIGS. 14 and 15 show the arrangement and operation of components of the adjustable aperture 500 that cooperate to control the transmission of light by adjusting the gap between two media.

The embodiment of the adjustable aperture 500 of FIGS. 14 and 15 includes a first optical layer in the form of a first plate 1400 having a first surface on which a first near field coupling layer 1402 is disposed, and a second optical layer in the form of a second plate 1404 having a second surface on which a second near field coupling layer 1406 is disposed. The first near field coupling layer 1402 is separated from the second near field coupling layer 1406 by a gap 1408. Each of the first near field coupling layer 1402 and the second near field coupling layer 1406 may be relatively thin, for example in the range of about 10 nm to 100 nm. One or more actuators 1422A, 1422B, etc. (collectively referred to as the actuator(s) 1422, and similar to the actuator(s) 622 previously described) may be coupled to either or both the first plate 1402 and the second plate 1404 to move the plate(s), so as to adjust the distance of the gap 1408.

Each of the first plate 1400 and the second plate 1404 may be a dielectric plate comprised of a material such as glass or other material. Each of the first near field coupling layer 1402 and the second near field coupling layer 1406 may be comprised of a material such as a noble metal, with nanostructures patterned into the noble metal of one or both of the first near field coupling layer 1402 and the second near field coupling layer 1406, so as to enhance near field coupling efficiency when the gap 1408 is small. For example, such nanostructures may be configured to resonate so as to cause surface plasma resonance, thereby enhancing the near field coupling and transmission.

FIG. 14 depicts a configuration wherein the actuator 1422 has been used to move the plate(s) so as to provide a large gap 1408. When the gap 1408 between the first plate 1402 and the second plate 1404 is large, there is little/weak near field coupling, and so very little or none of the light 1410 can transmit through the gap 1408. For example, most of the light 1408 may be absorbed and/or reflected. Consequently, the example of FIG. 14 may correspond to an equivalent aperture having a narrower size.

FIG. 15 depicts a configuration wherein the actuator 1422 has been used to move the plate(s) so as to provide a smaller gap 1408, relative to the larger gap depicted in FIG. 14. When the gap 1408 between the first plate 1402 and the second plate 1404 is smaller, there is a larger/stronger near field coupling, and so a larger amount of the light 1410 can be coupled into and transmit through the gap 1408. For example, when the distance through the gap 1408 is close to the wavelength of the light 1410 (such as 500 nm), most of the light 1410 can pass through the gap 1408 and the second plate 1404. The amount of transmission of the light 1410 through the gap 1408 may increase exponentially as the distance through the gap 1408 is reduced to below the wavelength of the light 1410. Consequently, the example of FIG. 15 may correspond to an equivalent aperture having a wider size.

The actuator 1422 (similar to the previously described actuator 622) can be used to change the gap 1408, and consequently changes the near field coupling and corresponding light transmission. As the coupling occurs in the near field domain, the position control accuracy of the actuator 1422 can be on the order of nanometers such as around 10 nm, and the stroke of the actuator 1422 can be small such as less than 1 micrometer, for example.

Figure 16:
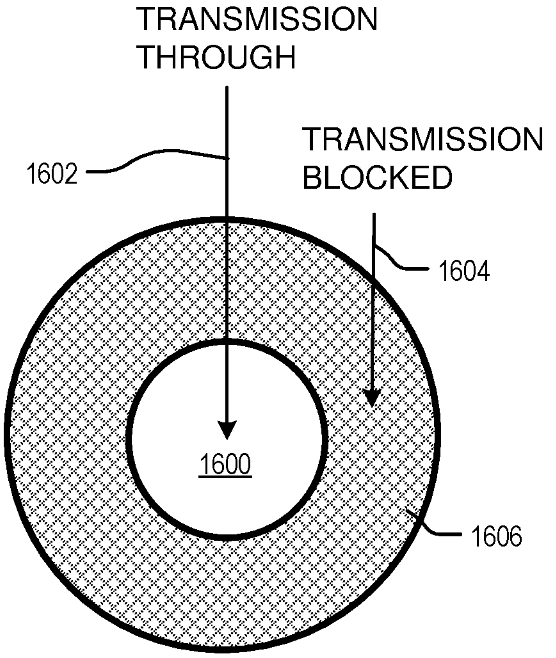
FIGS. 16 and 17 provide a comparison of an adjustable aperture and a shutter, in accordance with another embodiment of the disclosure.
Figure 17:
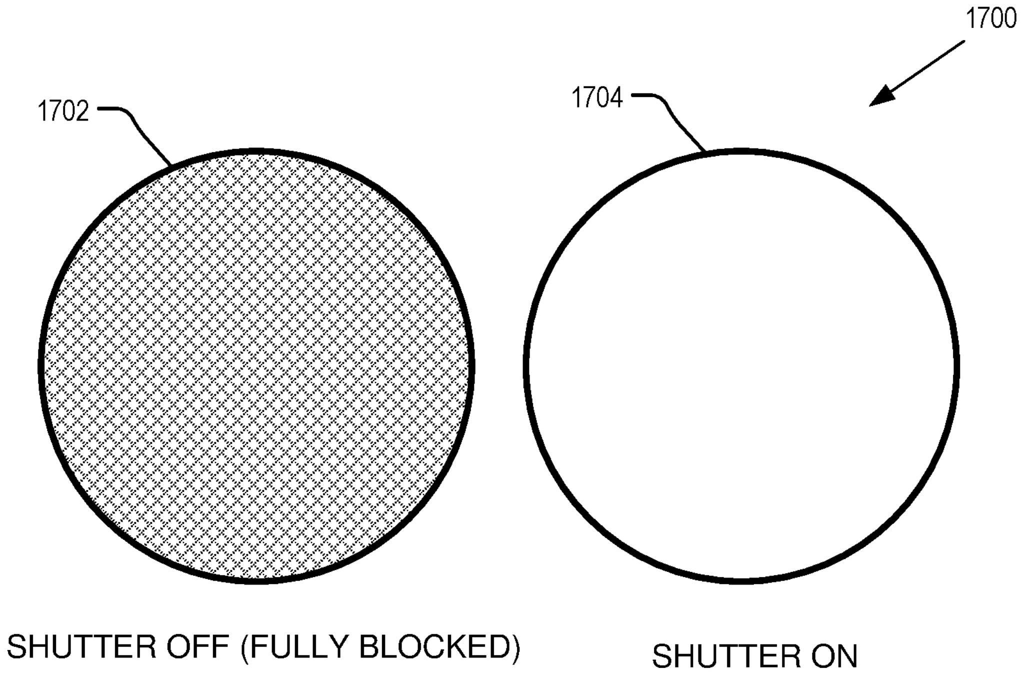

FIGS. 16 and 17 provide a comparison of an adjustable aperture and a shutter, in accordance with another embodiment of the disclosure. Specifically, the methods/techniques previously described above, which are based on index matching, optical absorption, or near field coupling to control the amount of light being transmitted or blocked by an optical aperture, can be used in some embodiments for an optical shutter.

FIG. 16 depicts an aperture 1600 through which light 1602 can be transmitted, while the transmission of light 1604 is blocked at 1606. The size of the aperture 1600 of FIG. 16 can be adjusted to be wider or narrower, using the various techniques previously described above, so as to control the amount of the light 1602 passing through the aperture 1600.

FIG. 17 depicts a shutter 1700 that has two states: off (closed) and open (on). At a first state 1702, the shutter 1700 is off (closed) and so light is fully blocked and cannot pass through the shutter 1700. At a second state 1704, the shutter 1700 is on (open) so as to permit the full transmission of light through the shutter 1700.

To turn off/on the shutter 1700 of FIG. 17, the above-described methods based on index matching, optical absorption, or near field coupling can be used to fully block light transmission or to permit full transmission of the light. More specifically, the actuator 622/1422 can be used to displace an optical element (such as the second plate 604/1404) so as to change a size of a gap between the second plate 604/1404 and the first plate 600/1400. As previously described above, using the actuator 622/1422 to change the size of the gap results in a corresponding change of the aperture size, including the capability to switch between the extreme states of fully blocking light transmission (state 1702) or permitting the full transmission of light (state 1704), which corresponds to a shutter operation.

The actuator 622/1422 is not required to travel a large stroke in order to displace a corresponding optical element (e.g., one or both of the plates 600 and 604), and so the shutter speed can be very fast. For example, an ultra-fast piezo actuator can move 100 nm within 1 microsecond, corresponding to a shutter speed of 1/1,000,000 of a second, which may be approximately three orders of speed faster than a standard mechanical shutter.

Figure 18:
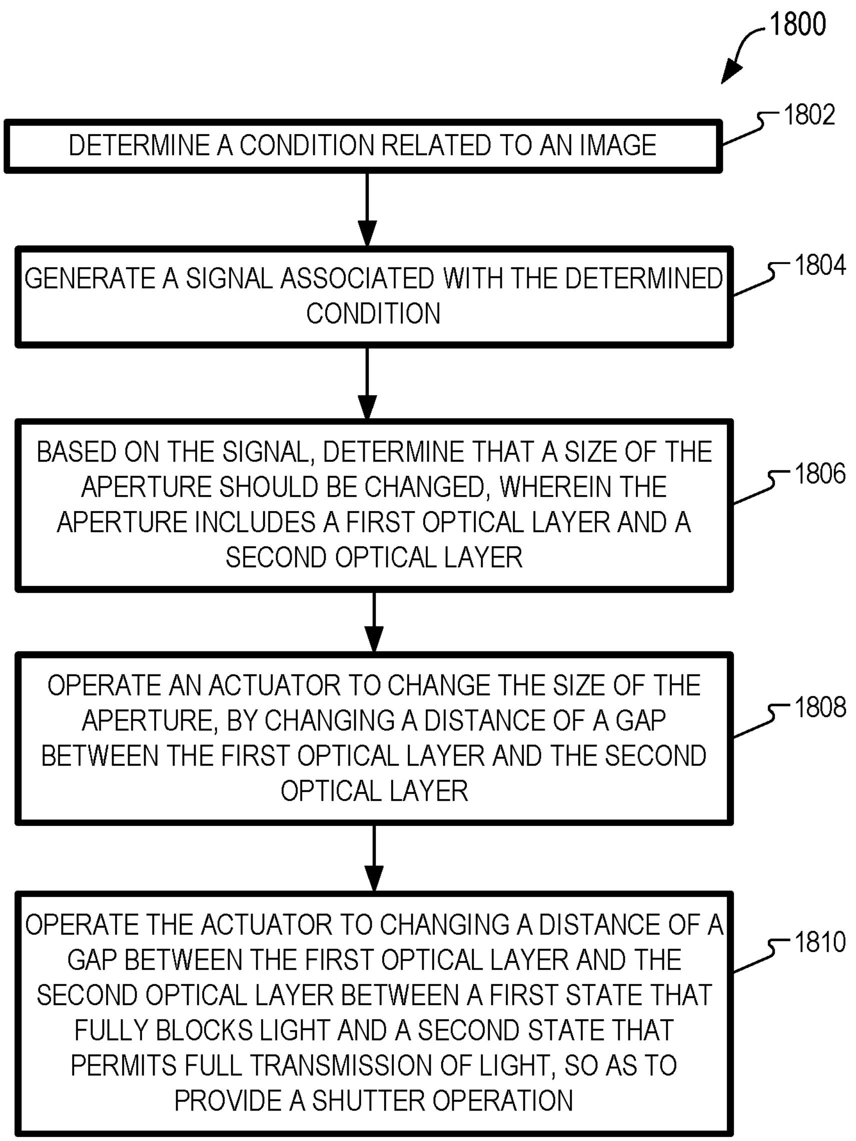
FIG. 18 is a flowchart of an example method to adjust an optical aperture, in accordance with an embodiment of the disclosure.

FIG. 18 is a flowchart of an example method/process 1800 to adjust an optical aperture, in accordance with an embodiment of the disclosure. The order in which some or all of the process blocks appear in the process 1800 should not be deemed limiting. Rather, one of ordinary skill in the art having the benefit of the present disclosure will understand that some of the process blocks may be executed in a variety of orders not illustrated, or even in parallel. Some operations of process blocks may be combined, eliminated, or supplemented with other process blocks. The operations depicted in the process 1800 may be performed by the imaging system 108, in cooperation with other components such as the control logic 107, sensor 132/232, camera 131/231 and its corresponding aperture components (including the actuator 622/1422), etc.

In a process block 1802, a condition related to an image is determined. For example, the sensor 132/232 operating as a light sensor for the camera 131/231 may determine/sense a current lighting condition, and then generate a signal associated with the determined lighting condition, at a process block 1804. As another example, the sensor 132/232 (and/or other sensor) operating as a distance sensor may determine that a camera is directed towards an object for portrait or landscape photography, and generate a signal associated with the determined distance/condition, at the process block 1804.

As still another example, the imaging system 108 may analyze an existing image, and determine that the image is too bright, too dark, out-of-focus at the foreground or background, or make some other assessment of a condition of the image that is being affected by aperture size. The imaging system 108 may then generate a signal at the process block 1804 associated with the condition determined from the image.

In a process block 1806 and based on the generated signal, the imaging system 108 may determine that a size of the aperture should be changed. For example and as previously described above, the structure of the aperture may include the first optical layer (first plate 600) and the second optical layer (second plate 604).

In a process block 1808, the control logic 107 may operate the actuator 622/1422 to change the size of the aperture. For example, the size of the aperture may be widened or narrowed, by using the actuator 622/1422 to move one or both of the first and second plates 600/604 to change a distance of a gap between the first and second plates 600/604.

In a process block 1810, the first and second plates 600/604 of the aperture may also be displaced by the actuator 622/1422 so as to provide a shutter operation. For example, the actuator 622/1422 may change the distance of the gap between the first and second plates 600/604 between a first state (state 1702) that fully blocks light and a second state (state 1704) that permits full transmission of light.

Thus, an apparatus, system, and method for an adjustable optical aperture, including operation as a shutter, for an imaging system have been described in this disclosure, with the adjustable aperture including first and second optical layers with a gap therebetween. Moving one or both of the first and second optical layers towards each other changes a distance of the gap (e.g., the spacing between the first and second optical layers). The change in the distance of the gap provides a corresponding change in the size of the aperture. These and other embodiments and related features are described in more detail above in connections with FIGS. 1-18.

The disclosed embodiments provide a compact adjustable/tunable aperture, with low power consumption, that may be used in AR/VR devices, wearable cameras, or other types of devices.

Embodiments may include or may be implemented in conjunction with an artificial reality (AR) system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., integrated in or used for the control logic 107 and/or the imaging system 108) in this disclosure may include one or more processors, microprocessors, multi-core processors, application-specific integrated circuits (ASIC), and/or field programmable gate arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., integrated in or used for the control logic 107 and/or the imaging system 108) may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network for communicating between devices may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels between or within devices may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments, including what is described in the Abstract, is not intended to be exhaustive or to limit the invention to the precise forms disclosed. While specific embodiments of, and examples for, the invention are described herein for illustrative purposes, various modifications are possible within the scope of the disclosure, as those skilled in the relevant art having the benefit of this disclosure will recognize.

These modifications can be made to the embodiments in light of the above detailed description. The terms used in the following claims should not be construed as limiting to the specific embodiments disclosed in the specification. Rather, the scope is to be determined entirely by the following claims, which are to be construed in accordance with established doctrines of claim interpretation.

What is claimed is:

1. An adjustable optical aperture, comprising:

a first optical layer having a first surface;

a second optical layer having a second surface;

an amorphous layer disposed between the first surface and the second surface;

an actuator configured to adjust a spacing between the first optical layer and the second optical layer, wherein adjustment of the spacing between the first optical layer and the second optical layer adjusts a size of the optical aperture by changing an amount of surface area contact between the amorphous layer and the first and second surfaces; and an optical stop material including an optically absorbent dye disposed between the first surface and the second surface, wherein at least one of the first surface and the second surface has a surface treatment to increase wetting of the optically absorbent dye on the first surface or the second surface.

2. The adjustable optical aperture of claim 1, wherein the first optical layer, the second optical layer, and the amorphous layer are refractive index matched.

3. The adjustable optical aperture of claim 1, wherein the first surface is sloped at an angle greater than a critical angle for incident light to experience total reflection.

4. The adjustable optical aperture of claim 1, wherein the first surface is formed with an optical grating, and wherein rulings of the optical grating are at an angle greater than a critical angle for incident light to experience total reflection.

5. An adjustable optical aperture, comprising:

a first optical layer having a first surface;

a second optical layer having a second surface;

a first near field coupling layer disposed on the first surface;

a second near field coupling layer disposed on the second surface, wherein the first and second near field coupling layers define a gap therebetween, and wherein the gap accommodates an electromagnetic field as an evanescent wave; and an actuator configured to adjust the gap between the first and second near field coupling layers, wherein adjustment of the gap adjusts near field tunneling across the gap for near field coupling that enables transmission of light from the first optical layer through the gap and into the second optical layer.

6. The adjustable optical aperture of claim 5, wherein the first and second near field coupling layers are made of a noble metal material, wherein the adjustable optical aperture further includes nanostructures formed in the noble metal material, and wherein the nanostructures are configured to resonate to enhance efficiency and strength of the near field coupling.

7. The adjustable optical aperture of claim 5, wherein adjustment of the gap to decrease a distance between the first and second near field coupling layers increases strength of the near field coupling to correspondingly increase the transmission of light through the gap, and wherein adjustment of the gap to increase the distance between the first and second near field coupling layers decreases the strength of the near field coupling to decrease the transmission of light through the gap.

8. An adjustable optical aperture, comprising:

a first optical layer having a first surface;

a second optical layer having a second surface, wherein the first surface is distanced from the second surface by a gap;

at least one actuator configured to adjust the gap between the first surface and the second surface, wherein adjustment of the gap between the first surface and the second surface controls an amount of light transmission from the first optical layer through the gap and into the second optical layer;

a first near field coupling layer disposed on the first surface of the first optical layer; and a second near field coupling layer disposed on the second surface of the second optical layer, wherein:

the gap is present between the first and second near field coupling layers, the gap accommodates an electromagnetic field as an evanescent wave, and the adjustment of the gap by the at least one actuator adjusts near field tunneling across the gap for near field coupling that enables the light transmission from the first optical layer through the gap and into the second optical layer.

9. The adjustable optical aperture of claim 8, wherein the at least one actuator is configured to move either or both the first optical layer and the second optical layer to increase or decrease a distance of the gap, wherein a relatively shorter distance of the gap increases the amount of light transmission, and wherein a relatively longer distance of the gap decreases the amount of light transmission.

10. The adjustable optical aperture of claim 8, wherein the first and second near field coupling layers are made of a noble metal material, and wherein the adjustable optical aperture further includes nanostructures formed in the noble metal material.

* * * * *